E. NORTON.

Improvement in Machines for Quarrying Stone.

No. 132,976.  Patented Nov. 12, 1872.

WITNESSES  INVENTOR

UNITED STATES PATENT OFFICE.

EDWIN NORTON, OF BOSTON, MASSACHUSETTS, ASSIGNOR OF ONE-THIRD INTEREST TO WM. F. BALDWIN, OF SAME PLACE.

IMPROVEMENT IN MACHINES FOR QUARRYING STONE.

Specification forming part of Letters Patent No. 132,976, dated November 12, 1872.

*To all whom it may concern:*

Be it known that I, EDWIN NORTON, of Boston, in the county of Suffolk and State of Massachusetts, have invented certain new and useful Improvements in Stone-Quarrying Machines, of which the following is a specification:

My invention relates to improvements on an invention patented by C. O. Luce and C. W. Green, dated December 29, 1868, entitled stone-quarrying machine; and consists in so forming the drill and arranging the same in connection with the saw that they may both work at the same time, the action of the one not interfering with the action of the other. This is accomplished by making the neck of the drill small, and so arranging the parts that the large part of the drill is below the line of the cut of the saw; the object of the invention being to avoid the necessity of lifting the drill at each movement of the saw, thus saving a great waste of power and time.

*Description of the Accompanying Drawing.*

Figure 1:
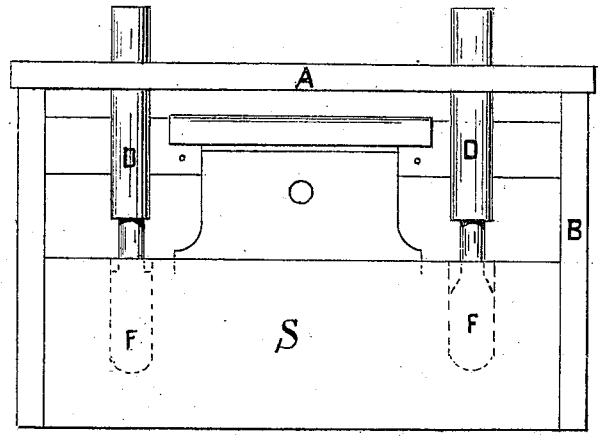
Figure 2:
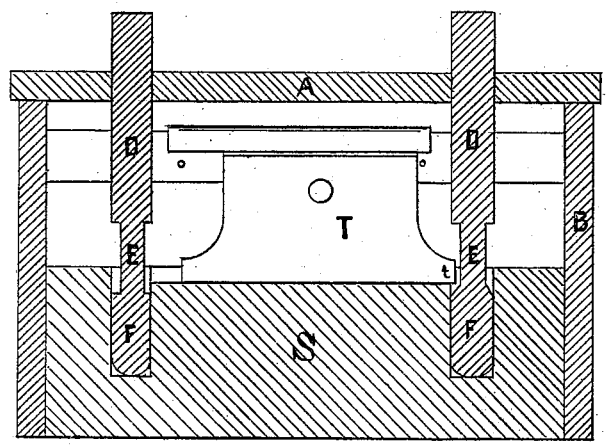

Figure 1 is an elevation of my invention, the actuating parts being omitted. Fig. 2 is a longitudinal vertical section of the same.

*General Description.*

Let S represent the stone to be cut, and A B the general frame of the machine. To this frame the drills D D and the saw T are attached. The points of the drills D D are provided with diamonds, and are made in any of the improved styles. Immediately above the cutting portion F the drill is contracted, as represented at E. The saw T plays back and forth, the cutting-ends advancing, so that at the end of each stroke the end of the saw projects into the hole made by the drill, as indicated by *t*, Fig. 2, the drill being made small at this point so that this action may take place. The drills are so arranged in the machine that the enlarged part F is always below the saw, so that, though the saw at each stroke enters the drill-holes, as shown in Fig. 2, it will not come in contact with the drill; hence the drill need not be taken from the hole.

In the machines now in use it is necessary to withdraw the drills at each stroke of the saw; and, as the drills are long and heavy, a large amount of power is consumed.

With my invention this withdrawal of the drills is avoided, therefore the machine will run much easier, and, the same force being exerted, will run with greater rapidity. The construction of the actuating parts of the machine will also be much simpler, as the drills are not lifted at all.

I claim as my invention—

The drills D D, as made with necks E E, in combination with the saw T, operating substantially as described, and for the purpose set forth.

EDWIN NORTON.

Witnesses:
FRANK G. PARKER,
WILLIAM EDSON.